United States Patent
Justin

(10) Patent No.: US 10,273,002 B2
(45) Date of Patent: Apr. 30, 2019

(54) IMU POD AND METHOD OF RETRIEVAL OF THE SAME

(71) Applicant: THE BOEING COMPANY, Chicago, IL (US)

(72) Inventor: Joseph E. Justin, Corona, CA (US)

(73) Assignee: THE BOEING COMPANY, Chicago, IL (US)

(*) Notice: Subject to any disclaimer, the term of this patent is extended or adjusted under 35 U.S.C. 154(b) by 263 days.

(21) Appl. No.: 14/957,172

(22) Filed: Dec. 2, 2015

(65) Prior Publication Data
US 2017/0158330 A1  Jun. 8, 2017

(51) Int. Cl.
| | | |
|---|---|---|
| B64D 1/02 | (2006.01) | |
| F42B 10/48 | (2006.01) | |
| F42B 10/56 | (2006.01) | |
| G01C 25/00 | (2006.01) | |

(52) U.S. Cl.
CPC ............... B64D 1/02 (2013.01); F42B 10/48 (2013.01); F42B 10/56 (2013.01); G01C 25/005 (2013.01)

(58) Field of Classification Search
None
See application file for complete search history.

(56) References Cited

U.S. PATENT DOCUMENTS

| | | | | |
|---|---|---|---|---|
| 2,873,074 A * | 2/1959 | Harris, Jr. | ................. | F41G 7/36 244/165 |
| 6,498,996 B1 * | 12/2002 | Vallot | .................... | G01C 19/56 702/103 |
| 6,761,334 B1 * | 7/2004 | Nutu | ..................... | B64D 25/12 244/120 |
| 7,540,227 B2 * | 6/2009 | McCants, Jr. | ............ | B64D 1/04 89/1.819 |
| 8,498,756 B1 * | 7/2013 | Sarver | ...................... | B64G 1/62 701/1 |
| 9,148,215 B1 * | 9/2015 | Bonawitz | ........... | H04B 7/18506 |
| 2007/0068373 A1 * | 3/2007 | McCantas, Jr. | .......... | B64D 1/04 89/1.11 |
| 2007/0129853 A1 * | 6/2007 | Greenfeld | .............. | G01C 11/02 701/3 |
| 2009/0109863 A1 * | 4/2009 | Leonard | ........... | G01R 31/31713 370/248 |
| 2009/0189016 A1 * | 7/2009 | Heppe | ...................... | B64F 1/02 244/110 R |

(Continued)

*Primary Examiner* — Shelley Chen
(74) *Attorney, Agent, or Firm* — Marshall, Gerstein & Borun LLP

(57) ABSTRACT

A pod assembly which includes a pod and an inertial measurement unit positioned within the pod. The pod assembly further includes deceleration hardware associated with the pod. A method for using a pod assembly, includes a step of securing the pod assembly, which includes a pod and an inertial measurement unit contained within the pod, to an aircraft and a step of operating the aircraft with the inertial measurement unit operating sensing movement and alignment of the pod and storing data corresponding to the sensed movement and alignment of the pod on a data collection assembly connected to the inertial measurement unit. The method further includes a step of releasing the pod assembly from the aircraft and a step of utilizing deceleration hardware associated with the pod to reduce rate of descent of the pod assembly released from the aircraft.

19 Claims, 9 Drawing Sheets

(56) References Cited

U.S. PATENT DOCUMENTS

| | | | | |
|---|---|---|---|---|
| 2012/0024136 A1* | 2/2012 | McCants, Jr. | ............ | B64D 1/04 89/1.819 |
| 2012/0210852 A1* | 8/2012 | McCants, Jr. | ............ | B64D 1/04 89/1.8 |
| 2017/0083019 A1* | 3/2017 | Knoblach | ............ | G05D 1/0055 |

* cited by examiner

IMU POD AND METHOD OF RETRIEVAL OF THE SAME

FIELD

The present invention relates to testing an inertial measurement unit ("IMU") and more particularly, retrieving data collected from an IMU that has operated during a test flight for comparing to positional data collected for the test flight from another source such as by a global positioning system (GPS).

BACKGROUND

Testing guidance systems for missiles has had limitations with respect to the data collected and was costly. An IMU positioned on a missile would operate from take-off of the missile and would guide the missile to a destination of impact. The IMU and the missile were destroyed by the impact landing. The IMU was programmed to deliver its payload of the missile and would be tracked by GPS, radar or other down range optical devices. The resulting destruction of the missile and IMU equipment would be costly and the true end to end data collection of that particular flight would not be reliably obtained.

Pods carrying IMU equipment for testing have been proposed and would be mounted to high performance aircraft for testing strategic-grade IMU's that could be used for guidance for a land based intercontinental ballistic missile ("ICBM"). The high performance aircraft could be used to attain high "g" forces that would be experienced in the flight of, for example, an ICBM. This testing of the IMU was an improvement over testing of the IMU secured to an actual missile that went through a flight and resulted in the missile coming down and impacting the ground at the end of its flight. However, a shortcoming of this testing approach of the aircraft carrying the IMU equipment is that the aircraft had to eventually return to its home base or a new landing airfield for refueling and post flight accuracy assessment. Thus, IMU's of these pods would not be able to experience a full end-to-end visual flight wherein the IMU would not land, for example, at a location on the ground to simulate, validate and demonstrate overall IMU full flight performance of that of, for example, an ICBM.

SUMMARY

An example of a pod assembly includes a pod which includes an inertial measurement unit positioned within the pod. The pod assembly further includes deceleration hardware associated with the pod.

An example of a method for using a pod assembly includes a step of securing the pod assembly, which includes a pod and an inertial measurement unit contained within the pod, to an aircraft and a step of operating the aircraft with the inertial measurement unit sensing movement and alignment of the pod from the operation of the aircraft and storing data corresponding to the sensed movement and alignment of the pod on a data collection assembly connected to the inertial measurement unit. The method further includes a step of releasing the pod assembly from the aircraft and a step of utilizing deceleration hardware associated with the pod to reduce rate of descent of the pod assembly released from the aircraft.

The features, functions, and advantages that have been discussed can be achieved independently in various embodiments or may be combined in yet other embodiments further details of which can be seen with reference to the following description and drawings.

DESCRIPTION

While various embodiments have been described above, this disclosure is not intended to be limited thereto. Variations can be made to the disclosed embodiments that are still within the scope of the appended claims.

Figure 1:
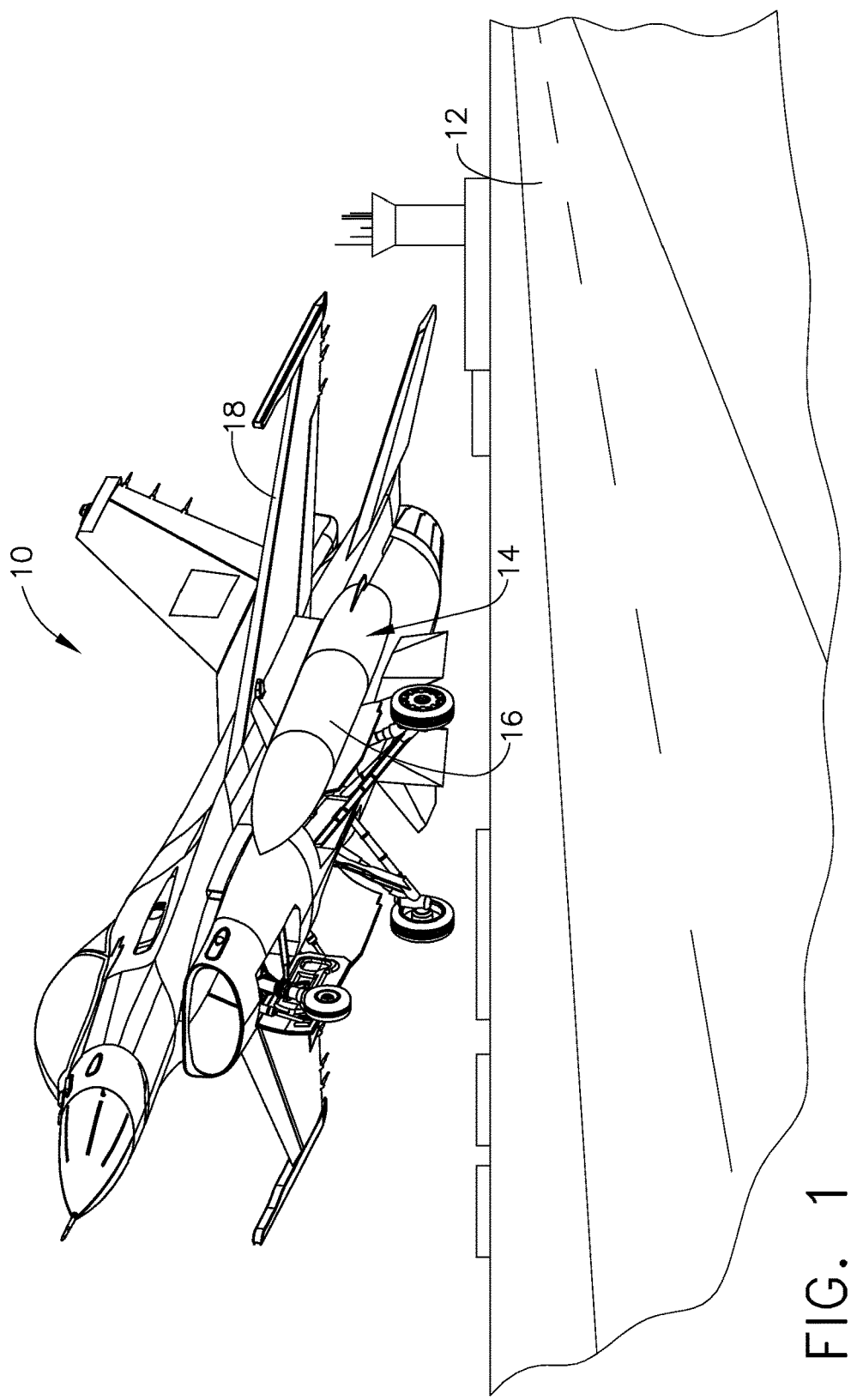
FIG. 1 is a perspective view of an aircraft at take-off carrying the pod assembly which includes an IMU positioned therein commencing a test flight for the IMU.
Figure 2:
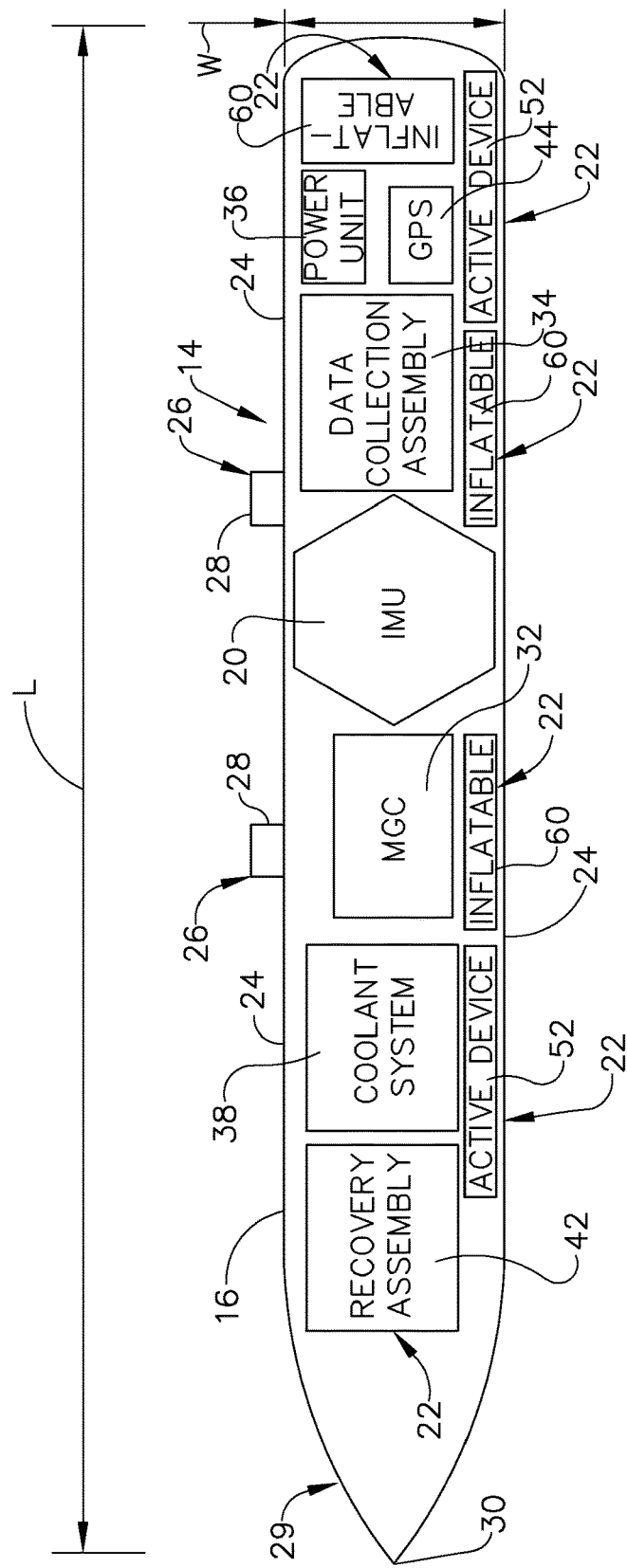
FIG. 2 is an enlarged schematic cross section of the pod assembly of FIG. 1.

In referring to FIG. 1, a high performance aircraft 10 is shown taking off from runway 12 for a test flight. Aircraft 10 has pod assembly 14 which includes pod 16 secured under wing 18 of aircraft 10. Aircraft 10 is being used to provide flight for testing and assessing accuracy of inertial measurement unit IMU 20, as shown in FIG. 2. IMU 20, in this example, is a strategic-grade IMU used in strategic missile systems such as in inter-continental ballistic missiles ("ICBM"). A high performance aircraft 10 is used, in this example, for the test flight to provide flight parameters with high g forces for testing the accuracy of the strategic-grade IMU 20.

In this instance, an F-16 is used for aircraft 10 for carrying pod assembly 14 containing the strategic-grade IMU 20. Other high performance aircraft such as F-14's and F-35's and the like can also be used in this test flight. These types of aircraft can provide needed high g's performance such as in excess of 4 g's with their high velocity and flight maneuvering capabilities.

As will be appreciated in the examples discussed herein of the testing of the strategic-grade IMU 20, IMU 20 will operate sensing movement and alignment of pod 16 from, in this example, the time of the commencement of the movement of aircraft 10 until a time in which pod assembly 14 is retrieved. The data collected through operation of IMU 20 throughout the test will ultimately be compared and scored against data of the flight from other instrumentation such as Global Positioning System ("GPS") and surveys conducted at the end of the testing as to the location and alignment of pod 16 at the end point of its journey. This testing will provide an end (point of commencement of movement of pod 16 and IMU 20) to end (point of retrieval of pod 16 and IMU 20) analysis of the travels of IMU 20 so as to validate the overall IMU 20 performance. The retrieval of pod assembly 14 which includes pod 16 which contains IMU 20 along with other instrumentation discussed herein, permits the capability of a full end-to-end visual IMU landing spot on the ground in simulating, validating and demonstrating overall IMU full performance for a strategic-grade IMU 20 which may be used for an ICBM, for example.

In referring to FIG. 2, pod assembly 14 is shown in a schematic format. Pod assembly 14 includes pod 16 which contains inertial measurement unit, IMU 20, and includes deceleration hardware 22. Deceleration hardware 22, as will be discussed in more detail below, includes one or more of different equipment, each of which, when in use slows down pod 16 after it has been released from aircraft 10. Pod 16 further includes housing 24 which includes at least one securement mount 26 secured to housing 24.

In this example, two securement mounts 26 are shown spaced apart from one another along length dimension "L" of housing 24. Securement mounts 26 in this example, include closed loops 28 which can be engaged with releasable clamps (not shown) of aircraft 10. With releasable clamps engaging securement mounts 26, pod 16 is held in position under wing 18 during operation of aircraft 10 during a flight test for IMU 20. Alternatively, other numbers of securement mounts 26 can be employed. For example, a single securement mount 26 could be positioned in a central portion of housing 24. In contrast, a plurality of securement mounts 26 can be spaced apart along a length "L" of housing 24. Each of the securement mounts 26 can have a corresponding releasable clamp associated with aircraft 10 to hold pod 16 in position under wing 18 of aircraft 10. As will be discussed below, securement mount 26 can also be used to support deceleration equipment 22 after pod assembly 14 has been released from aircraft 10.

With aircraft 10 operating in a g force range as mentioned above, it is preferable that pod 16 be aerodynamically configured. As seen in FIG. 2, housing 24 has length dimension "L" and width dimension "W" and an end portion 29 which narrows in width dimension "W" as housing 24 extends toward an end 30. End 30, in this example, is placed in a forward position for pod 16 with respect to aircraft 10, as seen in FIG. 1. This configuration provides pod 16 an aerodynamic profile.

Pod assembly 14, also contains missile guidance computer ("MGC") 32 within pod 16. MGC 32 is electronically connected and communicates with IMU 20. MGC 32 includes equipment such as electronic modules and provides programmable software modules and memory. MGC 32 provides interface signals to aircraft 10 and to global positioning system ("GPS") 44 which will be discussed below as well as to other hardware within pod assembly 14. IMU 20 comprises, in this example, equipment which detects accelerations and alignments, including items such as gimbals which operate in all three dimensions and provides in this example to MGC 32. This sensing equipment of IMU 20 senses the movement and alignment of pod 16 as IMU 20 progresses through an operational test flight of aircraft 10. Data collection assembly 34, which in this example includes a data processor, memory and input/output ("I/O") interfaces, is also positioned within pod 16 and is electronically connected to IMU 20 and MGC 32. The movement and alignment sensed by IMU 20 during the test flight of aircraft 10 from an end point to an end point is transmitted to and stored in data collection assembly 34. This configuration of IMU 20, MGC 32 and data collection assembly 34 provides sensing and storage of position and alignment data of pod 16 from a test flight.

Pod assembly 14 further includes power unit 36 which, in this example, includes a battery positioned within pod 16 which provides back up power to aircraft 10 and connects to ground power. Power unit 36 has sufficient output capabilities to provide power to electrical equipment within pod 16 during free fall of pod 16, through landing and recovery of pod 16, as will be further discussed below. Power unit 36 is electrically connected to all equipment contained within pod 16 which require electrical power to operate. Such equipment would include, for example, IMU 20, MGC 32, data collection assembly 34, coolant system 38, global positioning system (GPS) 44 and any other equipment which needs electrical power.

GPS 44 continually generates data of the position of pod assembly 14. GPS 44 is electronically connected to data collection assembly 34 which continually records and collects data generated by GPS 44. This data will which is generated by GPS 44, as will be discussed below, will be compared to the data collected from IMU 20 during the test operation. Coolant system 38 provides operational temperatures to equipment such as IMU 20, MGC 32, data collection assembly 34 and GPS 44. Such coolant system 38, in this example, would include a controller, coolant tubing, coolant, pump for coolant, thermal measuring devices and coolant tank. In other examples, coolant system 38 can include active electronic cooling which would employ for example thermoelectric coolers.

Figure 3:
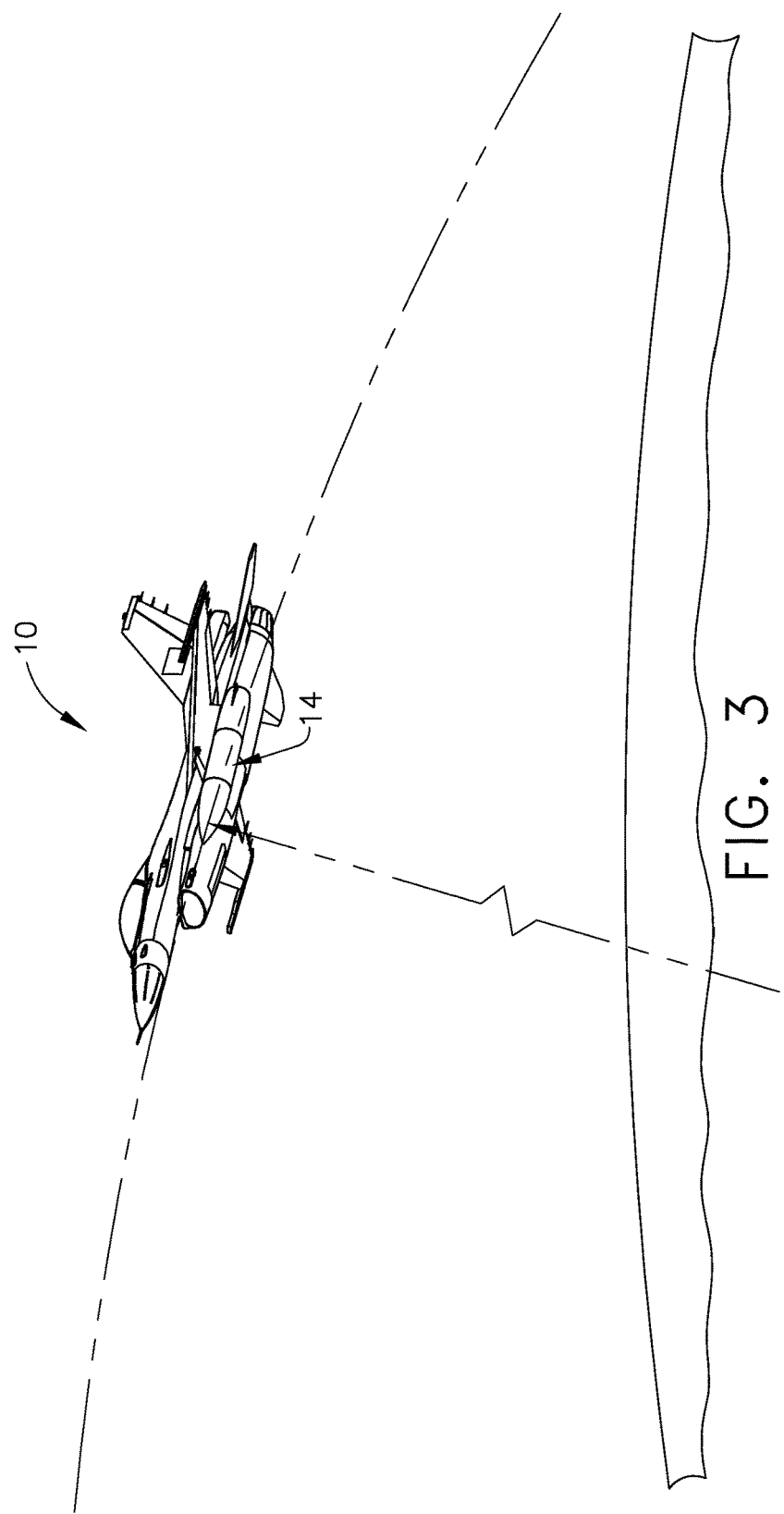
FIG. 3 is a perspective view of the aircraft of FIG. 1 in flight carrying the pod assembly testing the IMU.
Figure 4:
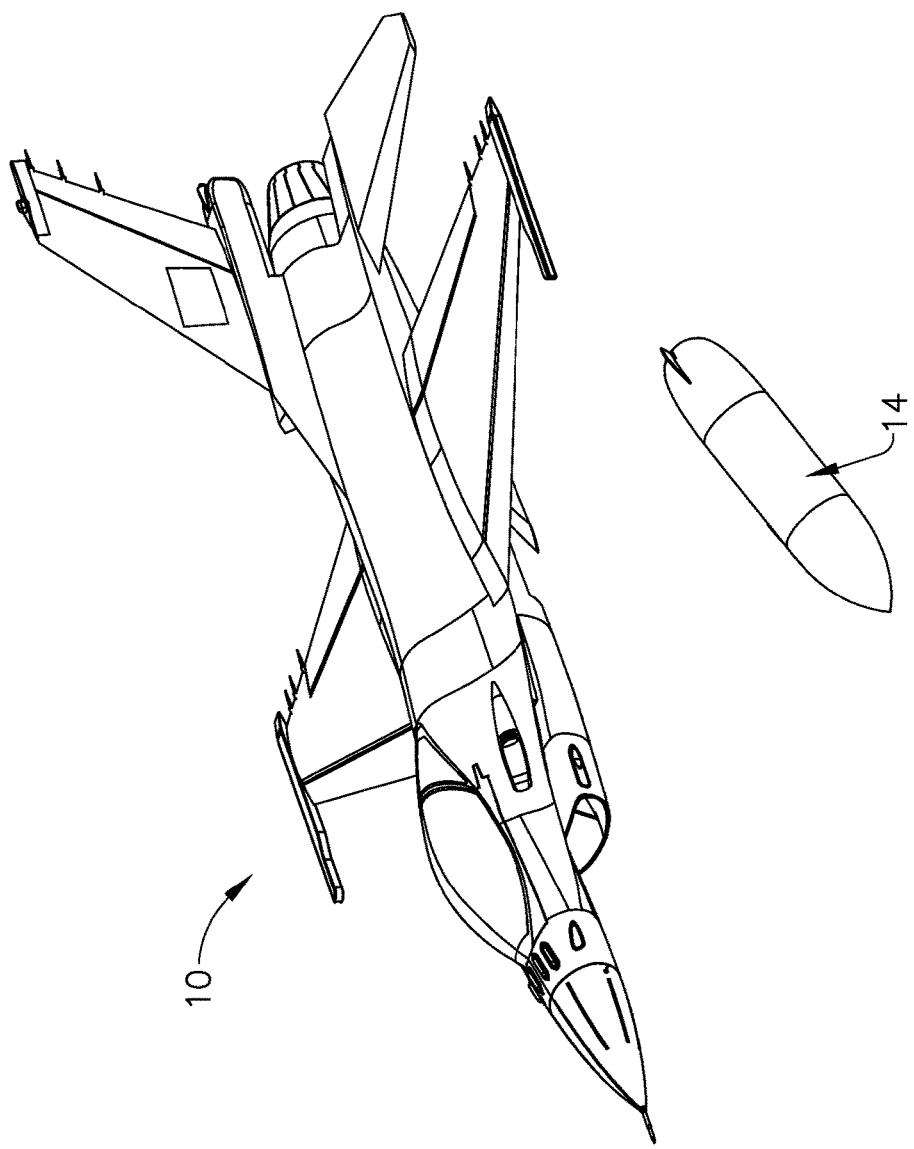
FIG. 4 is a perspective view of the aircraft of FIG. 3 releasing the pod assembly from the aircraft after an aircraft flight portion of the test of the IMU had been completed.

As seen in FIG. 3, pod assembly 14 containing data sensing and collection equipment such as IMU 20, MGC 32 and data collection assembly 34 is carried by aircraft 10 through a test flight. Data is collected by this sensing and collection equipment of pod assembly 14 as to g forces which are generated by aircraft 10 to pod 16 and alignment changes imparted by aircraft 10 to pod 16 during the test flight. Data is also collected by data collection assembly 34 that is generated by GPS 44. Once aircraft 10 has completed its predetermined maneuvers in the test flight, pod assembly 14 is released from aircraft 10 as seen in FIG. 4. At this point, IMU 20, MGC 32, data collection assembly 34 and GPS 44 continue to operate and data continues to be collected by data collection assembly 34 related to the travel and position of pod 16 of pod assembly 14.

Figure 5:
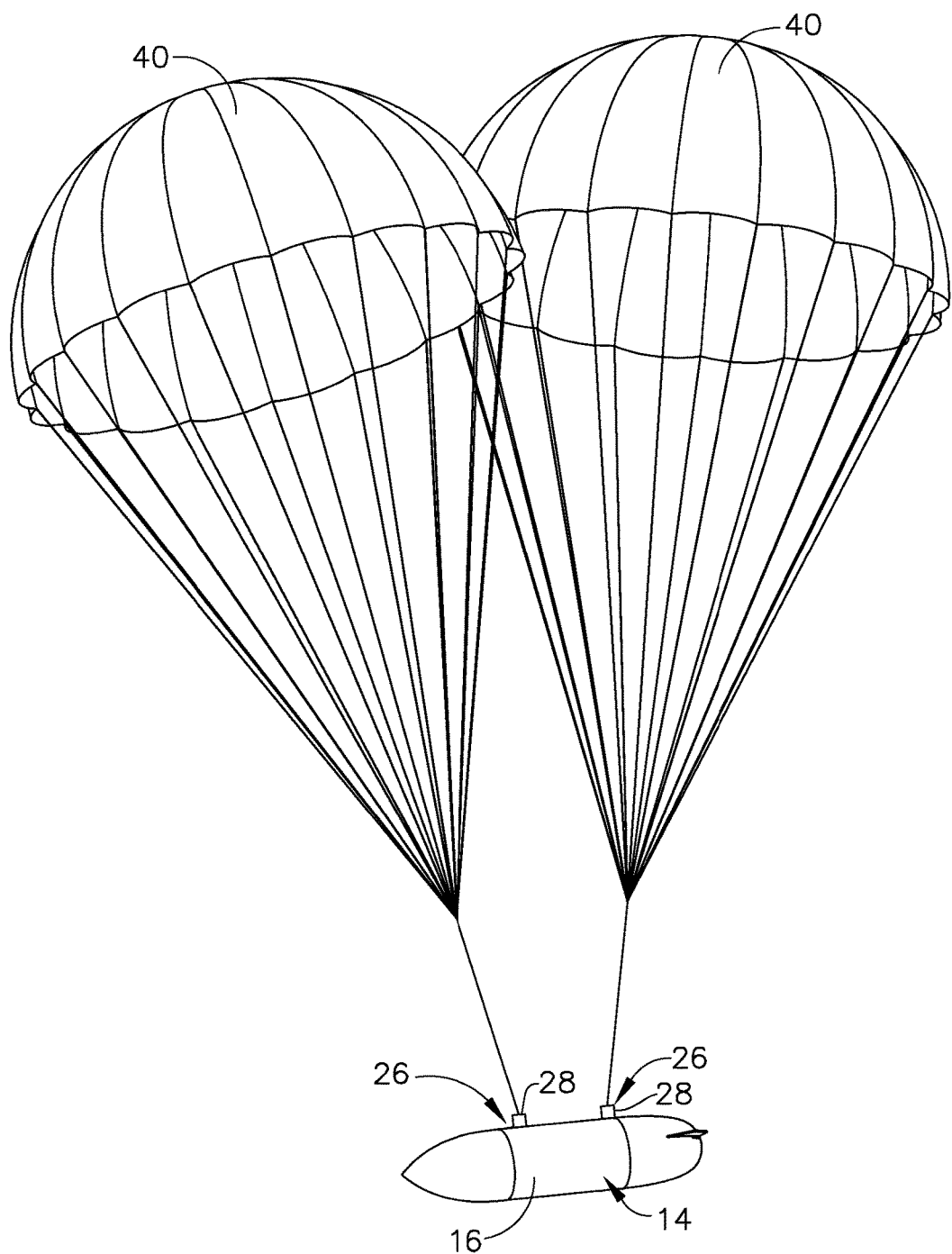
FIG. 5 is a perspective view of the pod assembly being decelerated with parachutes being deployed of the deceleration hardware of the pod assembly after the pod assembly has been released from the aircraft.

Pod assembly 14 is in free fall and in descent toward a ground location as seen in FIG. 4. Deceleration hardware 22, in this example, at least one parachute 40 is deployed, as seen in FIG. 5. In this example, two parachutes 40 are deployed from recovery assembly 42 within pod 16 and two parachutes 40 move to a position as seen in FIG. 5 wherein each of the two parachutes 40 is secured to one of the two securement mounts 26. Equipment for deploying parachutes 40 from within pod 16 to be secured to securement mounts 26 include parachute rigging and parachute lines. The securement of parachutes 40 are positioned to provide a balanced support of pod assembly 14. This balanced support provides pod 16 to maintain, in this example, a generally level orientation of pod 16, as seen in FIG. 5, so as to maintain gimbals positioned within IMU 20 within maximum limits of displacement.

Figure 8:
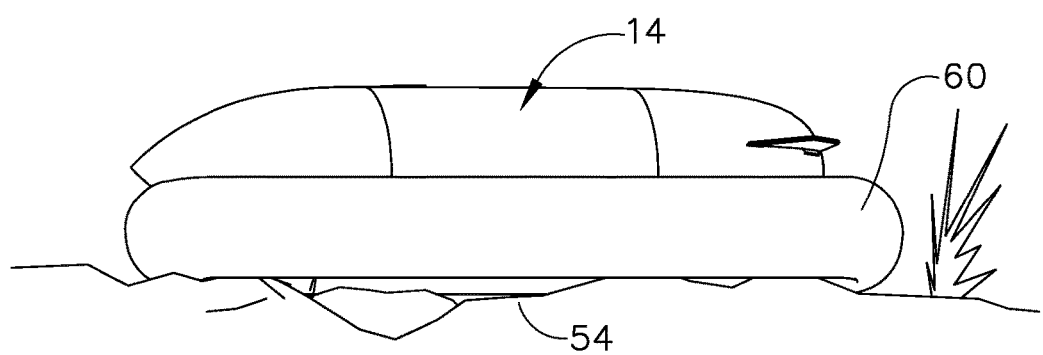
FIG. 8 is a perspective view of the pod assembly having landed at a ground location in a first embodiment of a step of retrieving the pod assembly.
Figure 9:
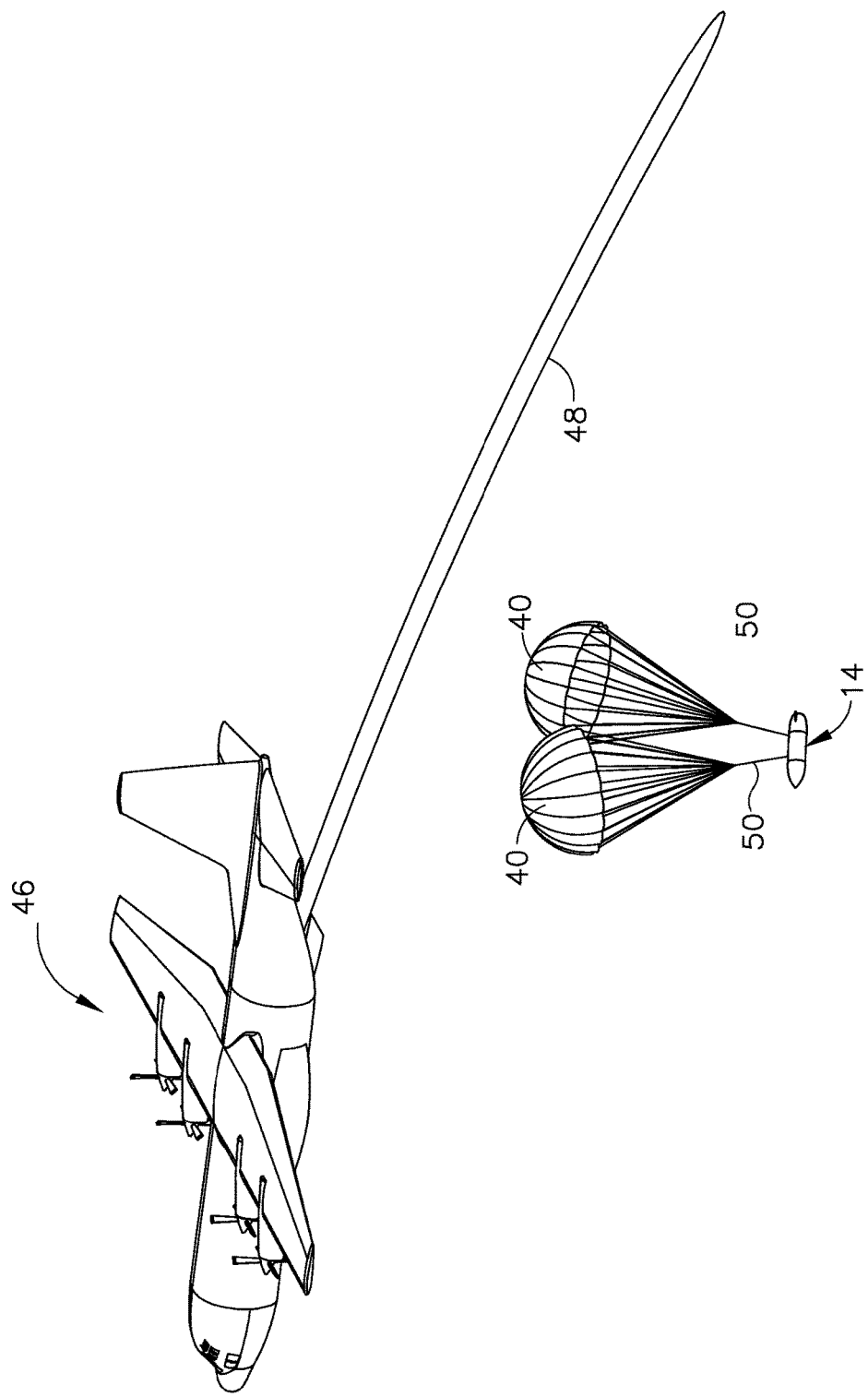
FIG. 9 is a perspective view of a second embodiment of a step of retrieving the pod assembly with another aircraft in a descent of the pod assembly.

There will be two examples of retrieving pod assembly 14, after pod assembly 14 has been released from aircraft 10, which will be discussed below. One example of retrieving pod assembly 14 is shown in FIG. 9 wherein another aircraft 46 which can include a wide variety of aircraft such as a C-130 or a Blackhawk helicopter, is equipped with ensnarement hook 48 secured to other aircraft 46. Other aircraft 46 takes an intercepting flight path relative to the descending pod assembly 14. Ensnarement hook 48 engages parachute line 50, for example, of at least one parachute 40 thereby grabbing pod assembly 14 out of parachute descent. Ensnarement hook 48 is drawn to other aircraft 46 whereat pod assembly 14 is pulled on board to other aircraft 46 and transported to a desired location. In another example of retrieving pod assembly 14, pod assembly 14 descends to a ground location 54, as seen in FIG. 8, as will be described in more detail below, whereat pod assembly 14 is retrieved from ground location 54.

Figure 6:
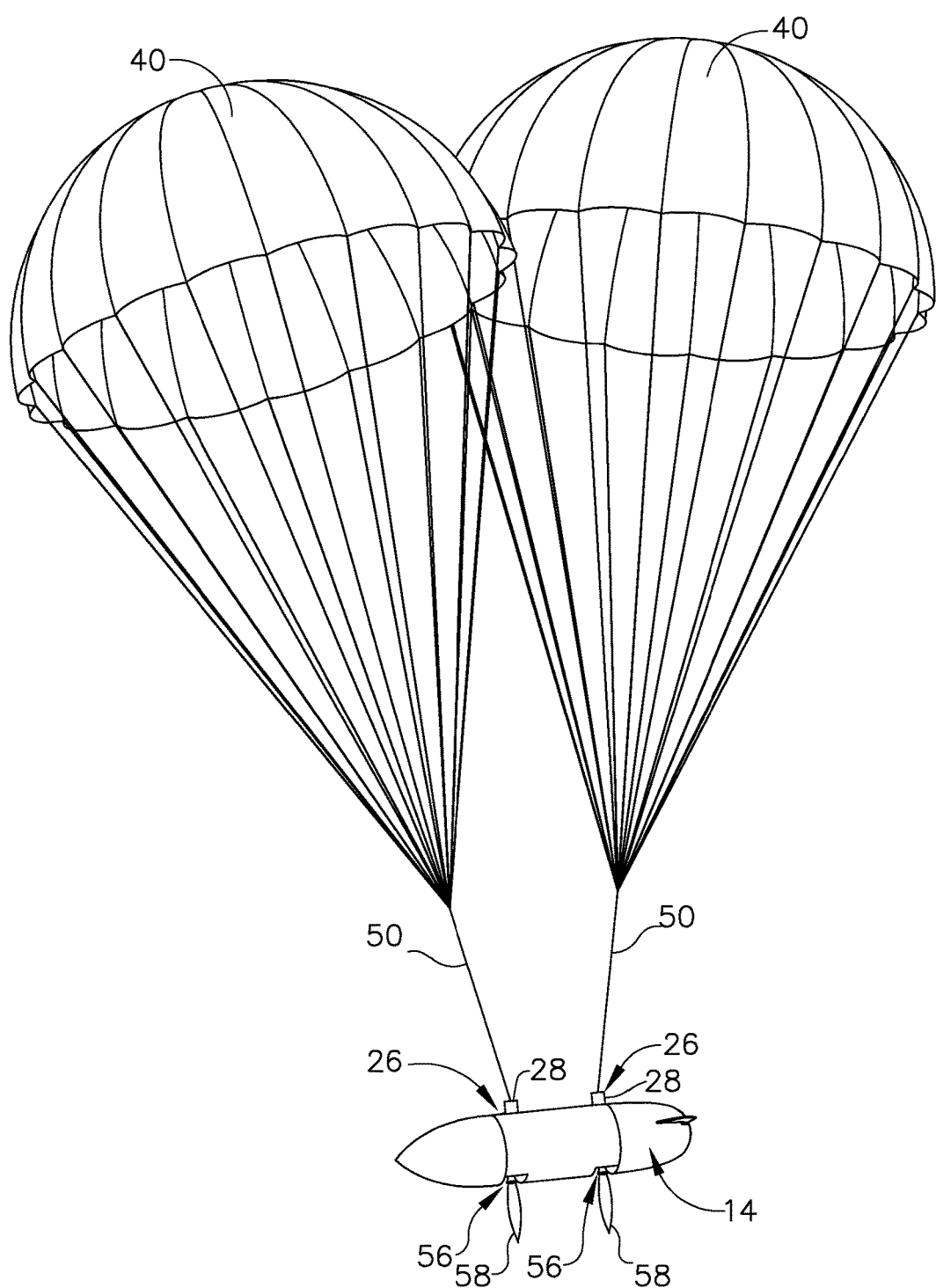
FIG. 6 is a perspective view of FIG. 5 with rocket engines ignited of the deceleration hardware for further deceleration of the pod assembly.

In the other example of retrieving pod assembly 14, deceleration hardware 22 is further utilized as shown in FIG. 6. As pod assembly 14, nears ground location 54, at least one active device or rocket deceleration engine 52, as seen in FIG. 2, is ignited. In FIGS. 2 and 6, two spaced apart rocket deceleration engines 52 are shown. Rocket deceleration engines 52 include in this example solid motor deceleration rockets. With active devices or rocket deceleration engines 52 ignited, in FIG. 6, parachutes 40 are released from securement mounts 26 at or near landing of pod assembly 14 at ground location 54. With rocket deceleration engines 52 ignited, exhaust end 56, which are positioned to direct exhaust 58 from rocket deceleration engines 52 outside of pod 16, are positioned in a direction toward upcoming ground location 54, as seen in FIG. 7.

Figure 7:
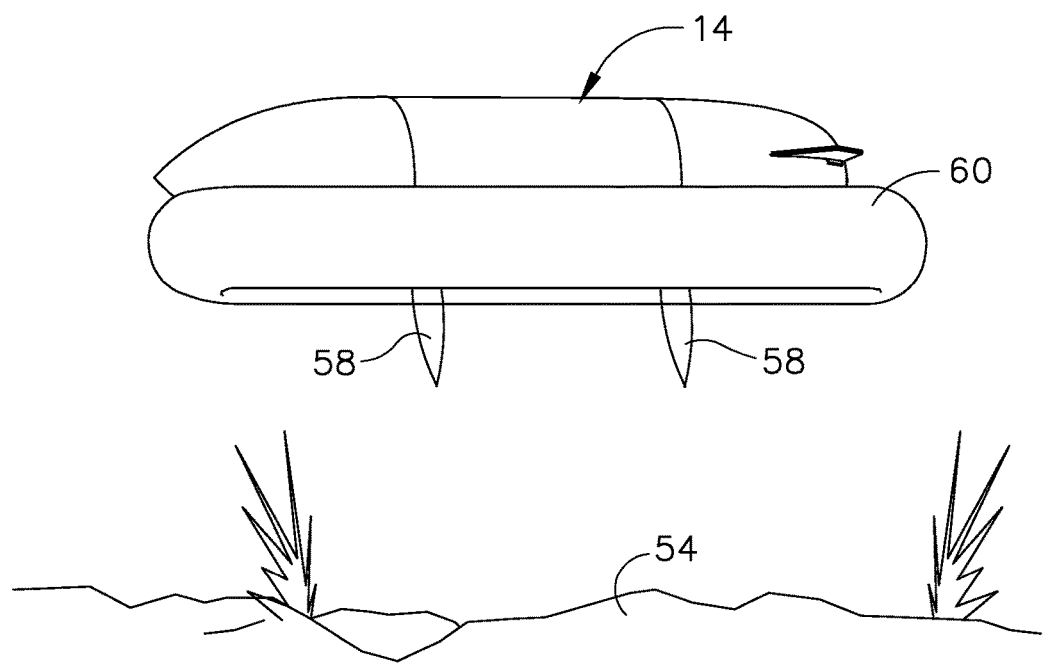
FIG. 7 is a perspective view of the pod assembly as it nears landing on the ground with inflatable landing device of the deceleration hardware deployed.

In referring to FIGS. 2 and 7, as pod assembly becomes closer to landing at ground location 54 further deceleration hardware 22 are deployed as an inflatable or inflatable landing device 60. Pod assembly carries within pod 16 inflatable or inflatable landing device 60 in a non-deployed position and as pod assembly 14 nears contact with ground location 54, inflatable landing device 60 inflates and extends outside of pod 16 into a deployed position, as seen in FIG. 7. With inflatable landing device 60 contacting ground location 54, as seen in FIG. 8 in this example, rocket deceleration engines 52 are shut down and pod assembly 14 comes to rest at ground location 54. This controlled descent and landing maintains the gimbals of IMU 20 within their maximum displacement limits. IMU 20 has been operating throughout the release, descent and landing and corresponding data to the movement and alignment of pod 16 has been stored in data collection assembly 34. Ground location 54 and the final alignment of pod assembly 14 are recorded in the data collection assembly 34. A ground team retrieving pod assembly 14 surveys ground location 54 and utilizes the recorded GPS 44 data to compare to information collected from IMU 20 to validate the IMU 20 accuracy. Additionally, the recovery team will survey the alignment of pod assembly 14 at ground location 54 and compare that data to the data sensed by IMU 20 and collected in the data collection assembly 34 to further validate IMU 20 accuracy.

Figure 10:
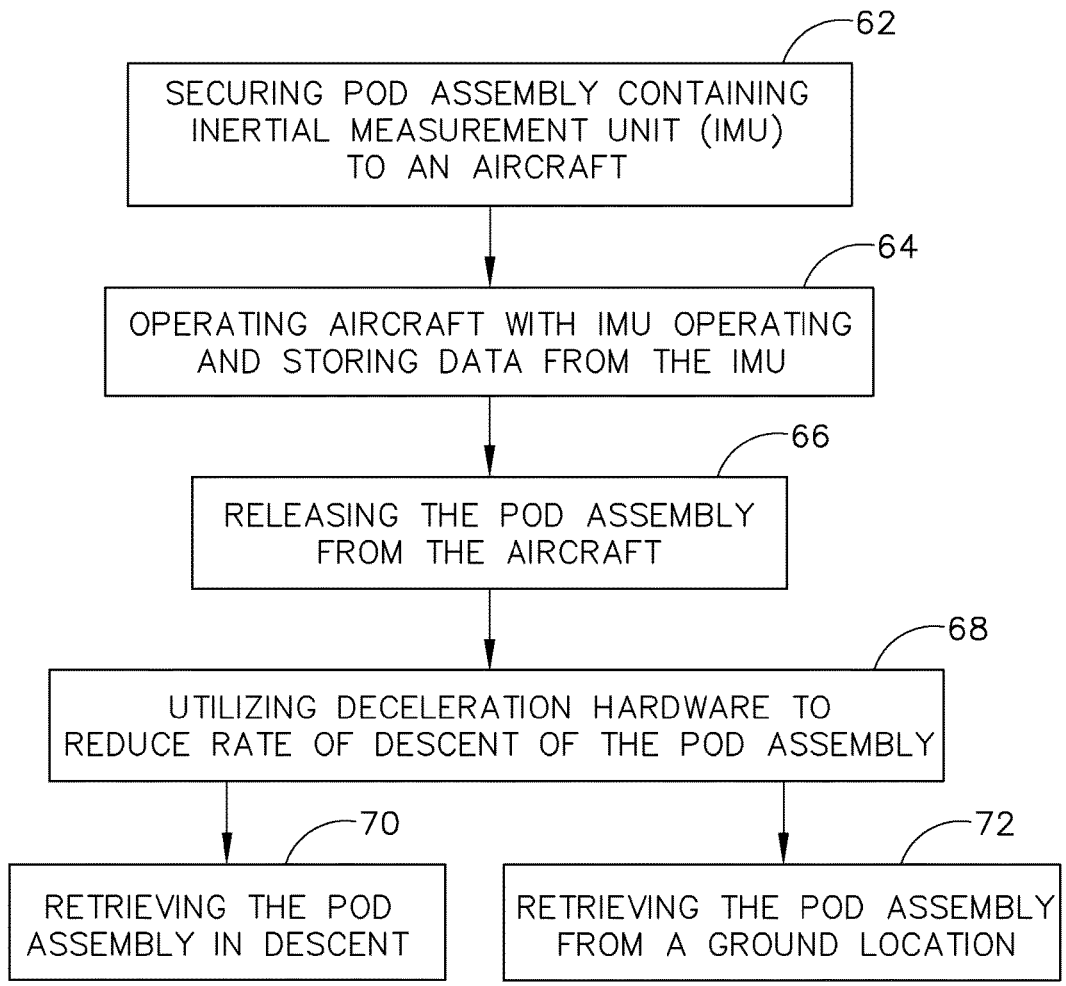
FIG. 10 is a flow chart of the method of using the pod assembly containing the IMU.

In referring to FIG. 10, a method for using pod assembly 14 includes a step of securing 62 pod assembly 14 which includes pod 16 and inertial measurement unit, IMU 20, contained within pod 16, to aircraft 10, as seen in FIGS. 1 and 2. As described earlier in this example, aircraft 10 is a high performance aircraft and IMU 20 is strategic-grade. Step 64, in FIG. 10, includes operating aircraft 10 with IMU 20 operating and storing data from IMU 20 on a data collection assembly 34 connected to the inertial measurement unit (IMU) 20, as seen in FIG. 3.

The method further step 66 in FIG. 10 which includes releasing pod assembly 14 from aircraft 10, as shown in FIG. 4. Step 68 includes utilizing deceleration hardware 22 associated with pod 16 to reduce a rate of descent of pod assembly 14 released from aircraft 10. As seen in FIG. 5, the step of utilizing deceleration hardware in this example includes a step of deploying at least one parachute 40 secured to pod 16. In this example two parachutes 40 are used after releasing the pod assembly 14 from aircraft 10.

The method further includes a first embodiment of step 70 of retrieving pod assembly 14 in descent. Step 70, as seen in FIG. 9, includes engaging a portion of the at least one parachute 40 with ensnarement hook 48. In this example, two parachutes 40 are used. Ensnarement hook 48 is secured to another aircraft 46 and another aircraft 46 flies and intercepting flight path with pod assembly 14 prior to the pod assembly 14 reaching a ground location 54. Ensnarement hook 48 with pod assembly 14 is drawn toward another aircraft 46 and pod assembly 14 is placed on board. IMU 20 and data collection assembly 34 continued to perform their operations from a time aircraft 10 initially began moving, in this example, through the time pod assembly 14 is brought on board other aircraft 46.

Step 68, of utilizing deceleration hardware 22, further includes a step of igniting at least one active device or deceleration rocket engine 52, as seen in FIGS. 2 and 6. Igniting deceleration rocket engine 52 further reduces a rate of descent of the pod assembly 14 after having been released from aircraft 10, as seen in FIG. 6. Parachutes 40 are normally released, as mentioned above, at or near pod assembly 14 landing at ground location 54. Step 70 of FIG. 10, a first embodiment of retrieving pod assembly is employed, retrieving the pod assembly 14 in descent, as seen in FIG. 9. Deceleration hardware 22 further includes the step of inflating an inflatable or inflatable landing device 60, as seen in FIGS. 2 and 7. Inflation of inflatable landing device 60 occurs as pod assembly 14 nears ground location 54 and provides a soft landing for pod assembly 14 keeping the gimbals of IMU 20 from displacing beyond their maximum limits. At this point in landing pod assembly 14, a second embodiment of retrieving pod assembly is employed. Step 72 includes retrieving pod assembly 14 from ground location 54.

Keep in mind, IMU 20 has operated sensing movement and alignment of pod 16, in this example, and storing the corresponding data in data collection assembly 34 connected to IMU 20 from a time of initial movement of aircraft 10. This operation of IMU 20 and data collection assembly 34 continues to operate through the release of pod assembly 14 from aircraft 10, during descent of pod assembly 14 and to landing of pod assembly at ground location 54.

Once pod assembly 14 is at ground location 54, this method further includes a second embodiment step 72 of retrieving pod assembly 14. Step 72 includes retrieving pod assembly 14 from ground location 54 which further includes a step of surveying ground location 54 and comparing ground location 54 to ground location 54 data stored in data collection assembly 34. The step of surveying further includes a step of surveying alignment of the pod 16 at ground location 54 and comparing the alignment to alignment data for pod assembly 14 stored in data collection assembly 34. With data available from data collection assembly 34 from IMU 20, GPS 44 and the surveys conducted analysis of the accuracy of the performance of IMU 20 can be conducted.

While various embodiments have been described above, this disclosure is not intended to be limited thereto. Varia-

What is claimed:

1. A pod assembly, comprising:
   a pod;
   an inertial measurement unit positioned within the pod;
   a global positioning system positioned within the pod;
   a data collection assembly positioned within the pod, wherein:
      the inertial measurement unit is electronically connected to the data collection assembly senses movement and alignment of the pod during flight operation of an aircraft, upon which the pod is carried, and senses movement and alignment of the pod through landing of the pod outside of the aircraft; and
      the global positioning system is electronically connected to the data collection assembly; and
   deceleration hardware associated with the pod wherein the deceleration hardware comprises an inflatable landing device.

2. The pod assembly of claim 1, wherein the pod comprises a housing, wherein at least one securement mount is secured to the housing providing releasable securement of the pod to the aircraft.

3. The pod assembly of claim 2, further includes two securement mounts positioned spaced apart from one another along a length dimension of the housing.

4. The pod assembly of claim 3 further including the deceleration hardware comprising two parachutes, wherein each of the two parachutes secure to one of the two securement mounts with the pod released from securement to the aircraft.

5. The pod assembly of claim 1, wherein the pod includes a housing having a length and width dimension in which the housing has an end portion which narrows in the width dimension as the housing extends toward an end of the pod.

6. The pod assembly of claim 1, further includes a missile guidance computer positioned within the pod electronically connected to the inertial measurement unit.

7. The pod assembly of claim 6, further includes the data collection assembly is electronically connected to the missile guidance computer.

8. The pod assembly of claim 7, further includes a coolant system positioned within the pod providing cooling to the inertial measurement unit, missile guidance computer and the data collection assembly within the pod.

9. The pod assembly of claim 8, further includes a power unit positioned within the pod and electrically connected to the inertial measurement unit, the missile guidance computer, the data collection assembly and the coolant system.

10. The pod assembly of claim 1, wherein the deceleration hardware comprises at least one parachute recovery assembly positioned within the pod.

11. The pod assembly of claim 1, wherein the deceleration hardware comprises at least one rocket deceleration engine which comprises an exhaust end of the rocket deceleration engine positioned to direct exhaust from the rocket deceleration engine in a direction outside of the pod.

12. The pod assembly of claim 1, wherein the inflatable landing device is positioned within the pod in a non-deployed position and outside of the pod in a deployed position.

13. A method for using a pod assembly, comprising the steps of:
   securing the pod assembly, comprising a pod and an inertial measurement unit, a global positioning system and a data collection assembly contained within the pod, to an aircraft, wherein the inertial measurement unit and the global positioning system are each electronically connected to the data collection assembly;
   operating the aircraft with the inertial measurement unit sensing movement and alignment of the pod during the operation of the aircraft and storing data corresponding to the sensed movement and alignment of the pod on the data collection assembly and the global positioning system storing data on the data collection assembly;
   releasing the pod assembly from the aircraft with the inertial measurement unit continuing to store the data corresponding to the sensed movement and alignment of the pod on the data collection assembly and the global positioning system continuing to store data on the data collection assembly;
   utilizing deceleration hardware associated with the pod to reduce rate of descent of the pod assembly released from the aircraft; and
   retrieving the pod assembly at a ground location after the pod assembly has landed, which includes a step of surveying the ground location and comparing the ground location to the ground location data stored in the data collection assembly.

14. The method of claim 13, the step of utilizing deceleration hardware includes a step of deploying at least one parachute secured to the pod after releasing the pod assembly from the aircraft.

15. The method of claim 14, further includes the step of retrieving the pod assembly in descent from the aircraft with engaging a portion of the at least one parachute with another aircraft prior to the pod assembly reaching the ground location.

16. The method of claim 13, the step of utilizing deceleration hardware further includes a step of igniting at least one rocket deceleration engine to reduce the rate of descent of the pod assembly after releasing the pod from the aircraft.

17. The method of claim 13, the step of utilizing deceleration hardware further includes the step of inflating an inflatable landing device.

18. The method of claim 13 further includes a step of operating the inertial measurement unit sensing the movement and alignment of the pod and storing the corresponding data of the movement and alignment of the pod within the data collection assembly connected to the inertial measurement unit from a time of initially moving the aircraft through and including releasing the pod assembly from the aircraft, during a descent of the pod assembly and to a landing of the pod assembly at the ground location.

19. The method of claim 18 further including the step of surveying alignment of the pod at the ground location and comparing the alignment of the pod to the alignment data for the pod stored in the data collection assembly.

* * * * *